United States Patent
Lindholm et al.

(10) Patent No.: US 12,177,801 B2
(45) Date of Patent: Dec. 24, 2024

(54) SYNCHRONIZATION PRIORITY FOR SIDELINK WIRELESS COMMUNICATIONS

(71) Applicant: NOKIA TECHNOLOGIES OY, Espoo (FI)

(72) Inventors: Jari Lindholm, Palojoki (FI); Jorma Kaikkonen, Oulu (FI); Sami Hakola, Kempele (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 349 days.

(21) Appl. No.: 17/904,191

(22) PCT Filed: Feb. 14, 2020

(86) PCT No.: PCT/US2020/018436
§ 371 (c)(1),
(2) Date: Aug. 12, 2022

(87) PCT Pub. No.: WO2021/162709
PCT Pub. Date: Aug. 19, 2021

(65) Prior Publication Data
US 2023/0124916 A1    Apr. 20, 2023

(51) Int. Cl.
*H04W 72/40*    (2023.01)
*H04L 5/00*    (2006.01)
(Continued)

(52) U.S. Cl.
CPC ......... *H04W 56/001* (2013.01); *H04L 5/0051* (2013.01); *H04W 72/40* (2023.01); *H04W 72/56* (2023.01)

(58) Field of Classification Search
CPC ............. H04W 72/40; H04W 56/0025; H04W 56/0015; H04W 56/001; H04W 72/56; H04W 56/002; H04L 5/0051
See application file for complete search history.

(56) References Cited

U.S. PATENT DOCUMENTS 12,058,742 B2 *   8/2024   Luo ................... H04W 72/1273
2020/0322910 A1   10/2020   Zhang et al.
(Continued)

FOREIGN PATENT DOCUMENTS

CN   109586879 A   4/2019

OTHER PUBLICATIONS

International Search Report and Written Opinion for International Application No. PCT/US2020/018436, mailed on Nov. 9, 2020, 18 pages.

(Continued)

*Primary Examiner* — Syed Ali
(74) *Attorney, Agent, or Firm* — Robert P. Michal, Esq.; Carter, DeLuca & Farrell LLP

(57) ABSTRACT

According to an example embodiment, a method may include transmitting, by a wireless node in a wireless network, a sidelink synchronization signal (S-SSB) block, including a sidelink primary synchronization signal (S-PSS), a sidelink secondary synchronization signal (S-SSS), a physical sidelink broadcast channel (PSBCH), and a demodulation reference signal (DM-RS), wherein the demodulation reference signal is based on at least a sidelink demodulation reference signal initialization value for the sidelink synchronization signal block to provide sidelink priority-related information for the sidelink synchronization signal block.

19 Claims, 7 Drawing Sheets

Example Wireless Network 130

(51) Int. Cl.
*H04W 56/00* (2009.01)
*H04W 72/56* (2023.01)

(56) References Cited

U.S. PATENT DOCUMENTS

| | | | |
|---|---|---|---|
| 2021/0051617 A1* | 2/2021 | Gulati | H04W 56/0015 |
| 2021/0203429 A1* | 7/2021 | Lin | H04L 5/0053 |
| 2021/0360520 A1* | 11/2021 | Chen | H04W 76/11 |
| 2022/0046562 A1* | 2/2022 | Yuan | H04L 5/0051 |
| 2022/0086782 A1* | 3/2022 | Chen | H04L 5/001 |
| 2022/0217717 A1* | 7/2022 | Kaikkonen | H04W 56/0005 |
| 2022/0346041 A1* | 10/2022 | Ko | H04W 72/1263 |
| 2022/0346080 A1* | 10/2022 | Ren | H04W 72/20 |

OTHER PUBLICATIONS

3GPP TSG RAN WG1 Meeting #98bis; R1-1911714; "Featured Lead Summary on AI 7.2.4.3 Sidelink Synchronization Mechanism", Source: CATT; Agenda Item: 7.2.4.3; Chongqing, China; Oct. 14-20, 2019, 35 pages.

GPP TSG RAN WG1 Meeting #99; R1-1913465; "Feature Lead Summary on AI 7.2.4.3 Sidelink Synchronization Mechanism"; Source: CATT; Agenda Item: 7.2.4.3; Reno, Nevada, USA; Nov. 18-22, 2019, 44 pages.

International Preliminary Report on Patentability for International Application No. PCT/US2020/018436, mailed on Aug. 25, 2022, 11 pages.

Office Action for India Application No. 202247051527, mailed on Nov. 28, 2022, 6 pages.

* cited by examiner

SYNCHRONIZATION PRIORITY FOR SIDELINK WIRELESS COMMUNICATIONS

CROSS-REFERENCE TO RELATED APPLICATIONS

This application is a national stage entry of International Application No. PCT/US2020/018436, filed Feb. 14, 2020, entitled "SYNCHRONIZATION PRIORITY FOR SIDELINK WIRELESS COMMUNICATIONS" which is hereby incorporated by reference in its entirety.

TECHNICAL FIELD

This description relates to wireless communications.

BACKGROUND

A communication system may be a facility that enables communication between two or more nodes or devices, such as fixed or mobile communication devices. Signals can be carried on wired or wireless carriers.

An example of a cellular communication system is an architecture that is being standardized by the 3$^{rd}$ Generation Partnership Project (3GPP). A recent development in this field is often referred to as the long-term evolution (LTE) of the Universal Mobile Telecommunications System (UMTS) radio-access technology. E-UTRA (evolved UMTS Terrestrial Radio Access) is the air interface of 3GPP's Long Term Evolution (LTE) upgrade path for mobile networks. In LTE, base stations or access points (APs), which are referred to as enhanced Node B (eNBs), provide wireless access within a coverage area or cell. In LTE, mobile devices, or mobile stations are referred to as user equipments (UE). LTE has included a number of improvements or developments. Aspects of LTE are also continuing to improve.

5G New Radio (NR) development is part of a continued mobile broadband evolution process to meet the requirements of 5G, similar to earlier evolution of 3G & 4G wireless networks. 5G is also targeted at the new emerging use cases in addition to mobile broadband. A goal of 5G is to provide significant improvement in wireless performance, which may include new levels of data rate, latency, reliability, and security. 5G NR may also scale to efficiently connect the massive Internet of Things (IoT) and may offer new types of mission-critical services. For example, ultra-reliable and low-latency communications (URLLC) devices may require high reliability and very low latency.

SUMMARY

According to an example embodiment, a method may include transmitting, by a wireless node in a wireless network, a sidelink synchronization signal (S-SSB) block, including a sidelink primary synchronization signal (S-PSS), a sidelink secondary synchronization signal (S-SSS), a physical sidelink broadcast channel (PSBCH), and a demodulation reference signal (DM-RS), wherein the demodulation reference signal is based on at least a sidelink demodulation reference signal initialization value for the sidelink synchronization signal block to provide sidelink priority-related information for the sidelink synchronization signal block.

According to an example embodiment, an apparatus may include means for transmitting, by a wireless node in a wireless network, a sidelink synchronization signal (S-SSB) block, including a sidelink primary synchronization signal (S-PSS), a sidelink secondary synchronization signal (S-SSS), a physical sidelink broadcast channel (PSBCH), and a demodulation reference signal (DM-RS), wherein the demodulation reference signal is based on at least a sidelink demodulation reference signal initialization value for the sidelink synchronization signal block to provide sidelink priority-related information for the sidelink synchronization signal block.

According to an example embodiment, an apparatus may include: at least one processor; and at least one memory including computer program code; the at least one memory and the computer program code configured to, with the at least one processor, cause the apparatus at least to: transmit, by a wireless node in a wireless network, a sidelink synchronization signal (S-SSB) block, including a sidelink primary synchronization signal (S-PSS), a sidelink secondary synchronization signal (S-SSS), a physical sidelink broadcast channel (PSBCH), and a demodulation reference signal (DM-RS), wherein the demodulation reference signal is based on at least a sidelink demodulation reference signal initialization value for the sidelink synchronization signal block to provide sidelink priority-related information for the sidelink synchronization signal block.

According to an example embodiment, a non-transitory computer-readable storage medium comprising instructions stored thereon that, when executed by at least one processor, are configured to cause a computing system to perform a method of: transmitting, by a wireless node in a wireless network, a sidelink synchronization signal (S-SSB) block, including a sidelink primary synchronization signal (S-PSS), a sidelink secondary synchronization signal (S-SSS), a physical sidelink broadcast channel (PSBCH), and a demodulation reference signal (DM-RS), wherein the demodulation reference signal is based on at least a sidelink demodulation reference signal initialization value for the sidelink synchronization signal block to provide sidelink priority-related information for the sidelink synchronization signal block.

According to an example embodiment, a method may include receiving, from a wireless node in a wireless network, a sidelink synchronization signal (S-SSB) block, including a sidelink primary synchronization signal (S-PSS), a sidelink secondary synchronization signal (S-SSS), a physical sidelink broadcast channel (PSBCH), and a demodulation reference signal (DM-RS), wherein the demodulation reference signal is based on at least a sidelink demodulation reference signal initialization value for the sidelink synchronization signal block to provide sidelink priority-related information for the sidelink synchronization signal block; and determining, based at least in part on the demodulation reference signal, sidelink priority-related information for the sidelink synchronization signal block.

According to an example embodiment, an apparatus may include means for receiving, from a wireless node in a wireless network, a sidelink synchronization signal (S-SSB) block, including a sidelink primary synchronization signal (S-PSS), a sidelink secondary synchronization signal (S-SSS), a physical sidelink broadcast channel (PSBCH), and a demodulation reference signal (DM-RS), wherein the demodulation reference signal is based on at least a sidelink demodulation reference signal initialization value for the sidelink synchronization signal block to provide sidelink priority-related information for the sidelink synchronization signal block; and means for determining, based at least in part on the demodulation reference signal, sidelink priority-related information for the sidelink synchronization signal block.

According to an example embodiment, an apparatus may include: at least one processor; and at least one memory including computer program code; the at least one memory and the computer program code configured to, with the at least one processor, cause the apparatus at least to: receive, from a wireless node in a wireless network, a sidelink synchronization signal (S-SSB) block, including a sidelink primary synchronization signal (S-PSS), a sidelink secondary synchronization signal (S-SSS), a physical sidelink broadcast channel (PSBCH), and a demodulation reference signal (DM-RS), wherein the demodulation reference signal is based on at least a sidelink demodulation reference signal initialization value for the sidelink synchronization signal block to provide sidelink priority-related information for the sidelink synchronization signal block; and determine, based at least in part on the demodulation reference signal, sidelink priority-related information for the sidelink synchronization signal block.

According to an example embodiment, a non-transitory computer-readable storage medium comprising instructions stored thereon that, when executed by at least one processor, are configured to cause a computing system to perform a method of: receiving, from a wireless node in a wireless network, a sidelink synchronization signal (S-SSB) block, including a sidelink primary synchronization signal (S-PSS), a sidelink secondary synchronization signal (S-SSS), a physical sidelink broadcast channel (PSBCH), and a demodulation reference signal (DM-RS), wherein the demodulation reference signal is based on at least a sidelink demodulation reference signal initialization value for the sidelink synchronization signal block to provide sidelink priority-related information for the sidelink synchronization signal block; and determining, based at least in part on the demodulation reference signal, sidelink priority-related information for the sidelink synchronization signal block.

Other example embodiments are provided or described for various described example methods, including: means for performing any of the example methods; a non-transitory computer-readable storage medium comprising instructions stored thereon that, when executed by at least one processor, are configured to cause a computing system to perform any of the example methods; and an apparatus including at least one processor, and at least one memory including computer program code, the at least one memory and the computer program code configured to, with the at least one processor, cause the apparatus at least to perform any of the example methods.

The details of one or more examples of embodiments are set forth in the accompanying drawings and the description below. Other features will be apparent from the description and drawings, and from the claims.

The details of one or more examples of embodiments are set forth in the accompanying drawings and the description below. Other features will be apparent from the description and drawings, and from the claims.

DETAILED DESCRIPTION

Figure 1:
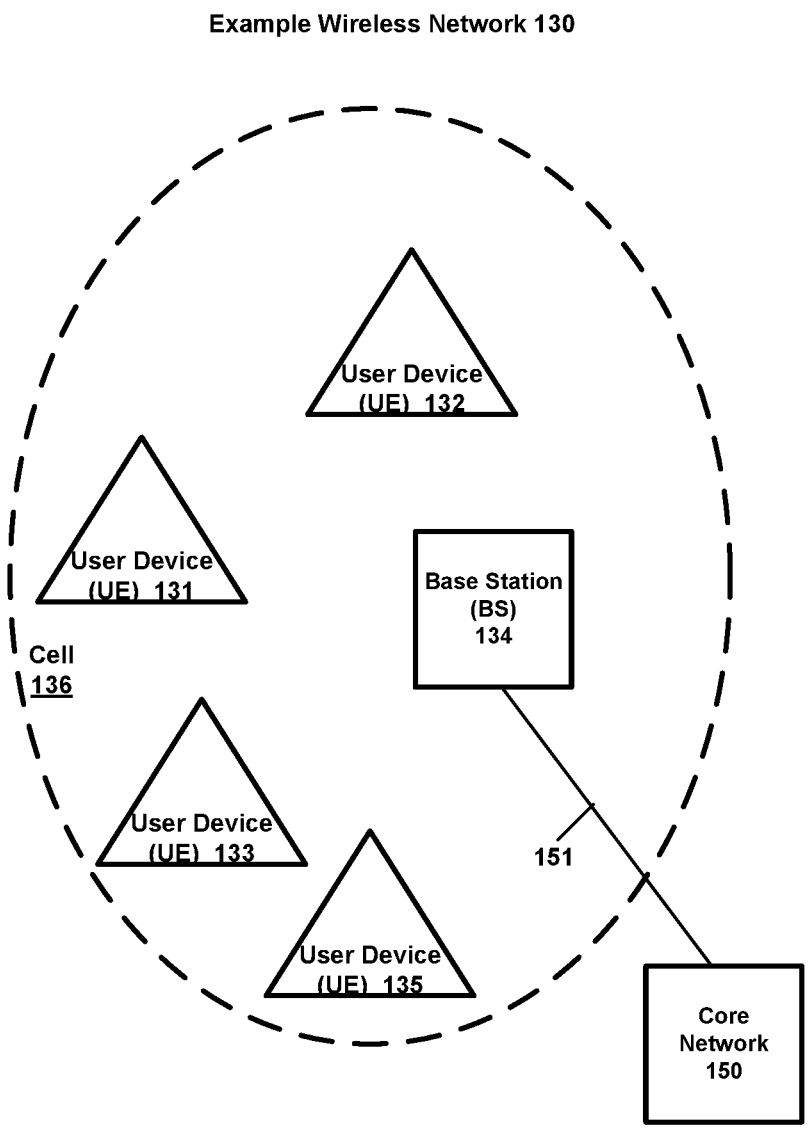
FIG. 1 is a block diagram of a wireless network according to an example embodiment.

FIG. 1 is a block diagram of a wireless network 130 according to an example embodiment. In the wireless network 130 of FIG. 1, user devices 131, 132, 133 and 135, which may also be referred to as mobile stations (MSs) or user equipment (UEs), may be connected (and in communication) with a base station (BS) 134, which may also be referred to as an access point (AP), an enhanced Node B (eNB), a BS, next generation Node B (gNB), a next generation enhanced Node B (ng-eNB), or a network node. The terms user device and user equipment (UE) may be used interchangeably. A BS may also include or may be referred to as a RAN (radio access network) node, and may include a portion of a BS or a portion of a RAN node, such as (e.g., such as a centralized unit (CU) and/or a distributed unit (DU) in the case of a split BS). At least part of the functionalities of a BS (e.g., access point (AP), base station (BS) or (e)Node B (eNB), BS, RAN node) may also be carried out by any node, server or host which may be operably coupled to a transceiver, such as a remote radio head. BS (or AP) 134 provides wireless coverage within a cell 136, including to user devices (or UEs) 131, 132, 133 and 135. Although only four user devices (or UEs) are shown as being connected or attached to BS 134, any number of user devices may be provided. BS 134 is also connected to a core network 150 via a S1 interface or NG interface 151. This is merely one simple example of a wireless network, and others may be used.

A base station (e.g., such as BS 134) is an example of a radio access network (RAN) node within a wireless network. A BS (or a RAN node) may be or may include (or may alternatively be referred to as), e.g., an access point (AP), a gNB, an eNB, or portion thereof (such as a centralized unit (CU) and/or a distributed unit (DU) in the case of a split BS or split gNB), or other network node.

According to an illustrative example, a BS node (e.g., BS, eNB, gNB, CU/DU, . . . ) or a radio access network (RAN) may be part of a mobile telecommunication system. A RAN (radio access network) may include one or more BSs or RAN nodes that implement a radio access technology, e.g., to allow one or more UEs to have access to a network or core network. Thus, for example, the RAN (RAN nodes, such as BSs or gNBs) may reside between one or more user devices or UEs and a core network. According to an example embodiment, each RAN node (e.g., BS, eNB, gNB, CU/DU, . . . ) or BS may provide one or more wireless communication services for one or more UEs or user devices, e.g., to allow the UEs to have wireless access to a network, via the RAN node. Each RAN node or BS may perform or provide wireless communication services, e.g., such as allowing UEs or user devices to establish a wireless connection to the RAN node, and sending data to and/or receiving data from one or more of the UEs. For example, after establishing a connection to a UE, a RAN node (e.g., BS, eNB, gNB, CU/DU, .

. . . ) may forward data to the UE that is received from a network or the core network, and/or forward data received from the UE to the network or core network. RAN nodes (e.g., BS, eNB, gNB, CU/DU, . . . ) may perform a wide variety of other wireless functions or services, e.g., such as broadcasting control information (e.g., such as system information) to UEs, paging UEs when there is data to be delivered to the UE, assisting in handover of a UE between cells, scheduling of resources for uplink data transmission from the UE(s) and downlink data transmission to UE(s), sending control information to configure one or more UEs, and the like. These are a few examples of one or more functions that a RAN node or BS may perform. A base station may also be DU (Distributed Unit) part of IAB (Integrated Access and Backhaul) node (a.k.a. a relay node). DU facilitates the access link connection(s) for an IAB node.

A user device (user terminal, user equipment (UE), mobile terminal, handheld wireless device, etc.) may refer to a portable computing device that includes wireless mobile communication devices operating either with or without a subscriber identification module (SIM), including, but not limited to, the following types of devices: a mobile station (MS), a mobile phone, a cell phone, a smartphone, a personal digital assistant (PDA), a handset, a device using a wireless modem (alarm or measurement device, etc.), a laptop and/or touch screen computer, a tablet, a phablet, a game console, a notebook, a vehicle, a sensor, and a multimedia device, as examples, or any other wireless device. It should be appreciated that a user device may also be (or may include) a nearly exclusive uplink only device, of which an example is a camera or video camera loading images or video clips to a network. A user device may be also MT (Mobile Termination) part of IAB (Integrated Access and Backhaul) node (a.k.a. a relay node). MT facilitates the backhaul connection for an IAB node.

In LTE (as an illustrative example), core network 150 may be referred to as Evolved Packet Core (EPC), which may include a mobility management entity (MME) which may handle or assist with mobility/handover of user devices between BSs, one or more gateways that may forward data and control signals between the BSs and packet data networks or the Internet, and other control functions or blocks. Other types of wireless networks, such as 5G (which may be referred to as New Radio (NR)) may also include a core network.

In addition, by way of illustrative example, the various example embodiments or techniques described herein may be applied to various types of user devices or data service types, or may apply to user devices that may have multiple applications running thereon that may be of different data service types. New Radio (5G) development may support a number of different applications or a number of different data service types, such as for example: machine type communications (MTC), enhanced machine type communication (eMTC), Internet of Things (IoT), and/or narrowband IoT user devices, enhanced mobile broadband (eMBB), and ultra-reliable and low-latency communications (URLLC). Many of these new 5G (NR)—related applications may require generally higher performance than previous wireless networks.

IoT may refer to an ever-growing group of objects that may have Internet or network connectivity, so that these objects may send information to and receive information from other network devices. For example, many sensor type applications or devices may monitor a physical condition or a status, and may send a report to a server or other network device, e.g., when an event occurs. Machine Type Communications (MTC, or Machine to Machine communications) may, for example, be characterized by fully automatic data generation, exchange, processing and actuation among intelligent machines, with or without intervention of humans. Enhanced mobile broadband (eMBB) may support much higher data rates than currently available in LTE.

Ultra-reliable and low-latency communications (URLLC) is a new data service type, or new usage scenario, which may be supported for New Radio (5G) systems. This enables emerging new applications and services, such as industrial automations, autonomous driving, vehicular safety, e-health services, and so on. 3GPP targets in providing connectivity with reliability corresponding to block error rate (BLER) of $10^{-5}$ and up to 1 ms U-Plane (user/data plane) latency, by way of illustrative example. Thus, for example, URLLC user devices/UEs may require a significantly lower block error rate than other types of user devices/UEs as well as low latency (with or without requirement for simultaneous high reliability). Thus, for example, a URLLC UE (or URLLC application on a UE) may require much shorter latency, as compared to a eMBB UE (or an eMBB application running on a UE).

The various example embodiments may be applied to a wide variety of wireless technologies or wireless networks, such as LTE, LTE-A, 5G (New Radio (NR)), cmWave, and/or mmWave band networks, IoT, MTC, eMTC, eMBB, URLLC, NR sidelink communications, etc., or any other wireless network or wireless technology. These example networks, technologies or data service types are provided only as illustrative examples.

As noted, according to an example embodiment, two UEs may directly communicate via a sidelink (SL) connection, which may also be referred to as a device-to-device (D2D) connection or a proximity services (ProSe) connection, for example. For example, a SL connection between two (or more) UEs may be used by UEs to communicate with each other, e.g., either instead of a Uu (BS-UE) (e.g., a cellular) connection, or in addition to a Uu (BS-UE) connection. A sidelink (SL) communication may typically involve a direct communication between UEs (e.g., between a transmit UE that is transmitting a signal via a sidelink connection and one or more receive UEs that are receiving the sidelink transmission), and does not require communication via a base station (BS) or gNB. Thus, a sidelink communication may involve a message or information being transmitted between two (or more) SL UEs that are within range of each other.

In an illustrative example embodiment, sidelink (SL) connections (e.g., a sidelink connection directly between UEs) may be used to support a variety of Vehicle-to-everything (V2X) communications or V2X applications or services. V2X may refer to, for example, the passing of information from a vehicle to any entity that may affect (or be related to) the vehicle, and vice versa, and may include, for example, specific types of communication, such as V2I (Vehicle-to-Infrastructure), V2V (Vehicle-to-vehicle), V2P (Vehicle-to-Pedestrian), V2D (Vehicle-to-device) and V2G (Vehicle-to-grid), etc.

Sidelink connections may be used to support a variety of sidelink services or V2X services, such as, for example: V2X safety services, V2X non-safety services, and/or other services. According to illustrative example embodiments, a UE may provide, e.g., to one or more other UEs via sidelink connections/communications, a V2X service, including the transmission of data or information for each of one or more V2X services, such as for one or more of, e.g., a platooning service, an advanced driving service, a remote driving service, a remote parking service, a cooperative maneuver service such as lane merge, a cooperative perception service such as a see-through service, etc., or other V2X services. These are merely some illustrative uses or applications for sidelink (SL) communications, and other applications or uses of SL communications may be provided.

In order to establish a SL connection between UEs, a SL synchronization procedure may be performed, e.g., in order for the UEs to obtain SL synchronization information for a SL connection or SL communication.

In an example embodiment, a SL synchronization procedure may be used to provide one or more UEs with SL synchronization information, to allow the UEs to become synchronized to allow SL communication via a SL connection. Sidelink (SL) synchronization information may be provided to UEs via a UE transmitting a sidelink synchronization signal (S-SSB) block. For example, a SL synchronization signal (S-SSB) block, may include a SL primary synchronization signal (S-PSS), a sidelink secondary synchronization signal (S-SSS), a physical sidelink broadcast channel (PSBCH), and a demodulation reference signal (DM-RS). In an example embodiment, the PSBCH and the DM-RS for a S-SSB block may be frequency multiplexed. In an example embodiment, the contents or payload of the PSBCH may include information that may allow a UE to access a sidelink channel. For example, the payload or contents of the PSBCH may include a SL master information block (MIB), which may include, an inCoverage bit (e.g., indicating whether a synchronization source for the S SSB is connected to, or within coverage of, a gNB/BS or not, and thus indicating if the S-SSB block is based on network/gNB synchronization, or is out of coverage), a SL TDD configuration that indicates the TDD UL-DL (time division duplex uplink-downlink) slot configuration, radio frame number and a slot index, and/or other SL-related parameters.

For a S-SSB block, the S-PSS and P-SSS may be associated with a physical layer sidelink identity (SL-ID). The SL-ID may also be referred to as a SL synchronization signal ID (SL-SSID). For example, a SL-ID for a S-SSB block may be a value between 0 and 671 (or other values, or within other ranges of values). Each different SL-ID may be associated with (or may map to) a different combination of S-PSS and S-SSS signals. Thus, a receiving UE may be able to determine a SL-ID for a S-SSB block based on the received S-PSS and P-SSS for the S-SSB block.

Table 1 below identifies some example SL synchronization priority levels, and associated parameters for a gNB/BS based synchronization. SL synchronization priority levels may range from P0', P1', P2', P3', P4', P5' and P6', where P0' is the highest priority level for SL synchronization (e.g., S-SSB) signals, and P6' is a lowest priority level for SL synchronization signals. Synchronization priority levels may indicate a level of priority for SL synchronization signals. For example, a SL synchronization priority level may be an indication of relative preference of SL synchronization (e.g., S-SSB) signals, e.g., where S-SSBs having a higher SL synchronization priority level may be preferable to S-SSBs having a lower SL synchronization priority level. As an illustrative example, SL synchronization signals (e.g. S-SSBs) having a higher SL synchronization priority level may be more reliable, more accurate, more recent/more current, etc., or other factor that may render such S-SSBs having a higher SL synchronization priority level as being preferable to S-SSBs having a lower SL synchronization priority level. Thus, in an example embodiment, UEs may search for S-SSBs having a higher SL synchronization priority level. For example, if a UE receives or detects a S-SSB having a same or lower SL synchronization priority level, then it may not use or may discard such S-SSB. Therefore, it may be desirable for a UE to be able to quickly determine a SL synchronization priority level of a S-SSB.

Table 1: Example gNB/eNB-based synchronization priority levels for SL communications.

TABLE 1

| SL Synch Priority level | Synchronization source, gNB/eNB-based synchronization | SLSS/PSBCH (S-SSB) parameters for TX | | |
|---|---|---|---|---|
| | | Synch resource | In-coverage indicator | SL-SSID (SL-ID) range |
| P0' | gNB/eNB | R1 | TRUE | [1, 335] |
| P1' | UE1 directly sync with gNB/eNB | R2 | FALSE | [1, 335] |
| P2' | UE2 indirectly sync with gNB/eNB | R1/R2 | FALSE | [337, 671] |
| P3' | GNSS | R3 | FALSE | 0 |
| P4' | UE3 directly sync with GNSS | R2 | FALSE | 336 |
| P5' | UE4 indirectly sync with GNSS by UE3 | R1/R2 | FALSE | 337 |
| P6' | UE5(>=2 hops sync with gNB/eNB by UE2) | R1/R2 | FALSE | [337, 671] |
| | UE6(>=2 hops sync with GNSS by UE4) | R1/R2 | FALSE | 337 |
| | UE7(standalone) | R1/R2 | FALSE | [338, 671] |

Referring to the examples shown in Table 1, each SL synchronization priority level may be associated with a number of parameters, including: a synchronization source for the UE that is transmitting the S-SSB block. The synchronization source may, for example, indicate a source from which the UE that is transmitting the S-SSB block determines its transmit timing and/or received the PSBCH payload. Some example SL synchronization priority levels and associated synchronization sources for the UE that is transmitting the S-SSB block may include, e.g.: P0', where the UE (who is in coverage or connected to the network/gNB) that is transmitting the S-SSB block receives synchronization information (e.g., PSBCH) from the network (e.g., from a gNB/eNB/BS) (hence the in-Coverage bit for priority level P0' is "True"); P1', where the UE transmitting the S-SSB block receives synchronization information (e.g., PSBCH) from a UE (UE1) that is connected to or within coverage of the network/gNB/eNB/BS, where UE1 that is connected to or directly synchronized with the gNB/eNB/network; P2', where the UE transmitting the S-SSB block receives synchronization information (e.g., PSBCH) from UE2 that is two hops away from the gNB/BS/network; P3', where a UE that is transmitting the S-SSB block receives synchronization information from GNSS), etc. In an illustrative example embodiment, P3' may indicate that UE cannot find a gNB based synchronization source and uses GNSS for synchronization information. In this case, the content of PSBCH is based on preconfiguration (preconfigured PSBCH). In some cases, GNSS may only provide timing/synchronization information, not usually PSBCH. Synchronization sources are also indicated for SL synchronization priority levels P4', P5', and P6'.

As shown in Table 1, each SL synchronization priority level may also be associated with one or more parameters, such as a SL resource (sync resource) for the transmission of S-SSB blocks, an In-coverage indicator, and a physical layer sidelink identity (SL-ID, or SL-SSID). In an example embodiment, a plurality of SL resources (e.g., SL resources R1, R2, and/or R3), which may (or may not) overlap in time, may be allocated for the transmission of S-SSB blocks. In some cases, some SL resources may be allocated for or associated with a transmission for a higher priority S-SSB transmission(s), while other SL resources may be allocated or associated with a lower priority S-SSB transmission. For example, as shown in the examples of Table 1, SL resource R1 may be allocated for the transmission of a P0' priority level S-SSB block, and resource R2 may be allocated or provided for the transmission of a P1' priority level S-SSB block. Also, for example, each resource (e.g., R1, R2, R3) may include, e.g., a 10 ms (or other time period) time resource, e.g., within a 160 ms S-SSB period. The In-Coverage indicator may indicate whether the UE that is transmitting the S-SSB block is within coverage of, or connected to, a gNB/BS/network. For example, for a S-SSB block transmitted by a UE that has a synchronization source of the gNB/eNB/BS (S-SSB block having a SL synchronization priority level P0'), this means that such transmitting UE is connected to or In-coverage of the gNB/eNB/BS/network, and hence, the Incoverage indicator is True for P0' priority level S-SSB blocks, and In-coverage indicator is False for other SL synchronization priority level S-SSB blocks shown in Table 1. As noted, the physical layer SL identity (e.g. SL-ID or SL-SSID) may be a value provided within a range (e.g., within a range of 0 to 671, as an example). Each SL synchronization priority level may be associated with a specific SL-ID, or a range of SL-ID values. As shown in Table 1, S-SSB blocks having either a P0' and P1' SL synchronization priority levels may be associated with, or may allow, the S-SSB to include a SL-ID within a range [1, 335], while S-SSB blocks having a P2' SL synchronization priority level may be associated with, or may allow, the S-SSB to include a SL-ID within a range [337, 671]. Other ranges of SL-ID are shown for the other SL synchronization priority levels.

As another example, Table 2 similarly shows values for a synchronization source, a SL resource (sync resource) for the transmission of S-SSB blocks, an In-coverage indicator, and a physical layer sidelink identity (SL-ID, or SL-SSID) for each of a plurality of example SL synchronization priority levels P0, P1, P2, P3, P4, P5 and P6, for example.

Table 2: Example GNSS-based synchronization priority levels for SL communications.

TABLE 2

| SL Synch Priority level | Synchronization source, GNSS-based synchronization | SLSS/PSBCH parameters for TX | | |
|---|---|---|---|---|
| | | Synch resource | In-coverage indicator | SL-SSID (SL-ID) range |
| P0 | GNSS (InC UE i.e. UE1) | R1 | TRUE | 0 |
| | GNSS (OoC UE) | R3 | FALSE | 0 |
| P1 | InC UE1 directly sync with GNSS (UE3) | R2 | FALSE | 0 |
| | OoC UE2 directly sync with GNSS | R2 | FALSE | 337 |
| P2 | UE3 indirectly sync with GNSS by InC UE | R1/R2 | FALSE | 336 |
| P3 | gNB/eNB | R1 | TRUE | [1, 335] |
| P4 | InC UE5 directly sync with gNB/eNB | R2 | FALSE | [1, 335] |
| P5 | UE6 indirectly sync with gNB/eNB by InC UE(UE5) | R1 | FALSE | [337, 671] |
| P6 | UE7(>=2 hops sync with GNSS by InC UE) | R1/R2 | FALSE | 336 |

TABLE 2-continued

| SL Synch Priority level | Synchronization source, GNSS-based synchronization | SLSS/PSBCH parameters for TX | | |
|---|---|---|---|---|
| | | Synch resource | In-coverage indicator | SL-SSID (SL-ID) range |
| | UE8(>=2 hops sync with gNB/eNB by InC UE) | R1/R2 | FALSE | [337, 671] |
| | UE9(>=2 hops sync with GNSS by OoC UE) | R1/R2 | FALSE | 337 |
| | UE10(standalone) | R1/R2 | FALSE | [338, 671] |

Figure 2:
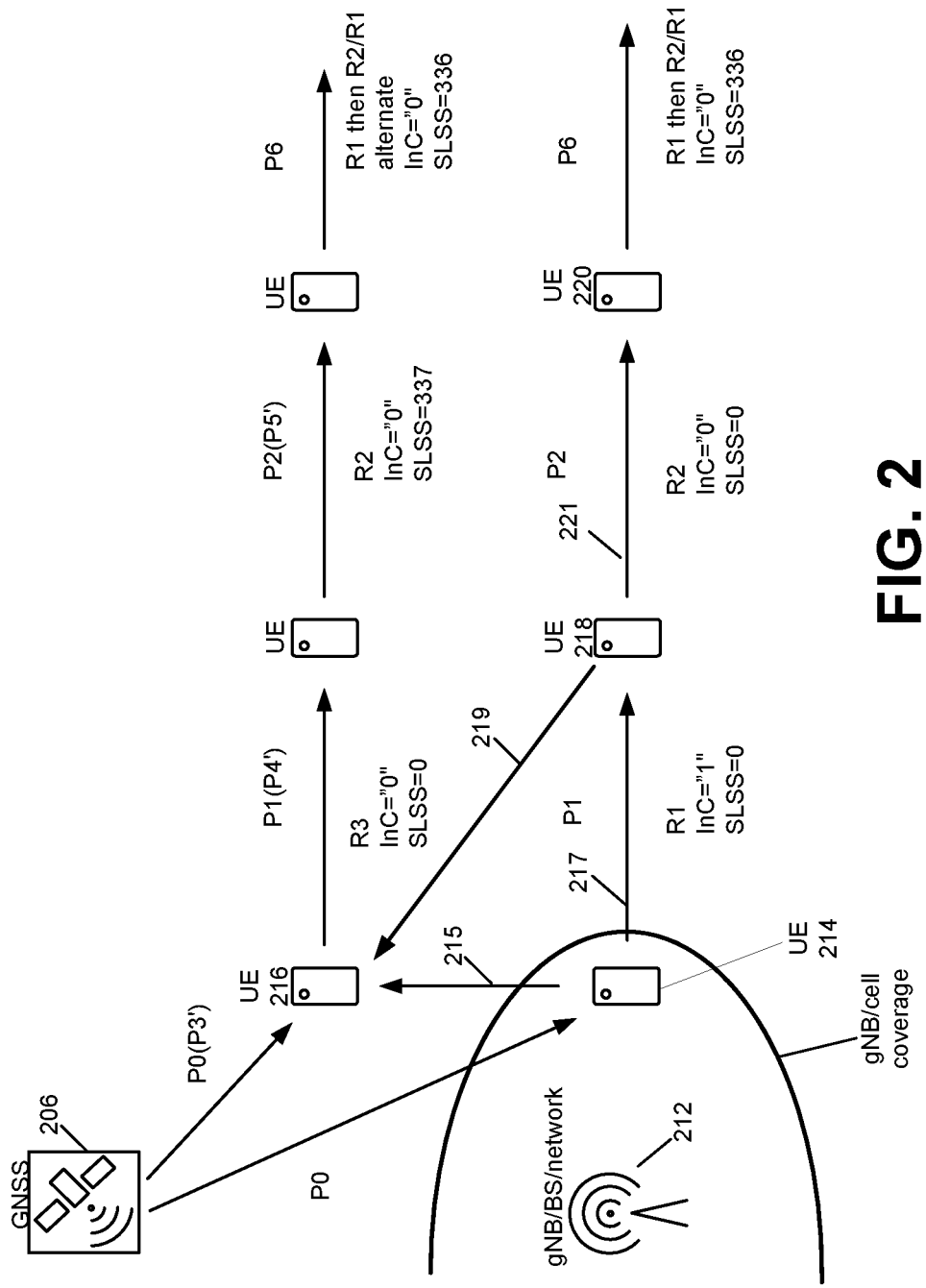
FIG. 2 is a diagram illustrating communications related to sidelink synchronization according to an example embodiment.

FIG. 2 is a diagram illustrating communications related to sidelink synchronization according to an example embodiment. A number of UEs are shown, which may transmit and/or receive SL synchronization information (e.g., S-SSB blocks, and possibly other synchronization information). A GNSS satellite 210 and a gNB/BS 212 are shown. A UE 214 may be within coverage of the cell for gNB 212. Each of the UEs may have (or have received) a preconfigured PSBCH, which may be used if a higher priority signaled PSBCH is not received by a UE. Thus, UE 214 may receive a signaled PSBCH from the gNB, and may transmit the signaled PSBCH to other UEs as part of a S-SSB block(s) transmission. In an illustrative example, a bit or flag within the PSBCH (or within the DM-RS that is used to decode or demodulate the PSBCH) may indicate whether the PSBCH is signaled or preconfigured, e.g., where a signaled PSBCH may be considered a higher priority than (or preferable to) a preconfigured PSBCH. A UE 216 is provided as well. As shown in FIG. 2, both UE 214 and UE 216 may receive satellite synchronization signals from GNSS 210, for example. Also, UE 216 may receive gNB/network signaled PSBCH (network-based PSBCH) via S-SSB block transmission via line 215 from in-coverage UE 214. Also, UE 218 may receive network-based (or gNB/network signaled) PSBCH via S-SSB block transmitted via line 217 from UE 214. Alternatively, UE 216 may receive the gnB signaled (or network-based) PSBCH via line 219 from out of coverage UE 218.

With reference to FIG. 2, and Table 2, in terms of a synchronization source and a priority level, for example, UE 214 may transmit a S-SSB block via line 217 to UE 218, where such S-SSB would include a gNB/network signaled (or network based) PSBCH, and have a SL synchronization priority level of P0 and use resource R1, since the synchronization source for such S-SSB block is GNSS 210 via In-coverage UE 214, and hence, the S-SSB block transmitted via line 217 includes a InC indicator is set to True or "1", uses R1 for transmission, and has a SL-SSID=0, also as shown in first row of Table 2). Also, for example UE 218 may transmit a S-SSB block via line 221 to UE 220, which may include a gNB/network signaled PSBCH (because the signaled PSBCH received by UE 218 from UE 214), and have a SL synchronization priority level of P1 and use resource R2, since the synchronization source for such S-SSB block is GNSS via In-coverage UE 214.

However, a number of challenges or issues may exist with respect to transmission and monitoring (or receiving) of SL S-SSB blocks. First, at least in some cases, it may not be possible to distinguish between SL synchronization priority levels for some S-SSB blocks. For example, as shown in Table 1, SL synchronization priority levels P2' and P5' may use the same SL resource(s) (R1/R2), the In-coverage indicator is false, and may use the same SL-ID of [337,671].

Thus, a UE receiving a S-SSB block that is transmitted via SL resource R1 or R2, has an In-coverage indicator of False, and has a S-PSS and a S-SSS associated with a SL-ID in the range [337, 671], may be unable to determine whether the SL synchronization priority level for such S-SSB block is a P2' or a P5' SL synchronization priority level. Similarly, for Table 2, for P0 and P1 SL synchronization priority levels, the SL-ID is set to 0 for both UE1 and UE3, such that the receiving UE cannot distinguish whether the transmitting UE is directly (higher priority) or indirectly (lower priority) synchronized to GNSS.

Furthermore, in some cases, a UE may be permitted to transmit multiple S-SSBs within a SSB period, and the SL resources, e.g., R1, R2, R3 may overlap in time, at least in some cases. Thus, due to multiple S-SSBs transmitted by one or more UEs and possibly overlapping SL resource time periods, a receiving UE may not necessarily be able to determine a SL resource (e.g., R1, R2, R3) that is being used to transmit a S-SSB block. Thus, in some cases, a receiving UE that cannot determine a SL resource (e.g., as either R1, R2, or R3) may further prevent the receiving UE from determining a specific SL synchronization priority for one or more received S-SSB blocks.

Furthermore, the In-coverage bit may be provided as a field or bit within the PSBCH payload or contents, and the In-coverage bit may, in some cases, be used by a receiving UE to distinguish between multiple possible SL synchronization priority levels for a S-SSB block. However, at least in some cases, in order to obtain the In-coverage bit for a S-SSB block, the receiving UE may need to first decode the payload of the PSBCH, which consumes time and battery power of a UE, especially when performed for many S-SSB blocks, e.g., as the UE may search for newer and/or or higher priority level S-SSB blocks.

As a result, according to one or more of these various examples described above (as illustrative examples), a UE seeking to obtain SL synchronization signals (e.g., S-SSB blocks, such as those S-SSB blocks having a same or higher priority than the UE currently has) may, at least in some cases, be unable to determine a SL synchronization priority level (or distinguish between multiple SL synchronization priority levels) for a S-SSB block, and/or may be required to expend time and power to decode a PSCBH of each (or one or more) of the received S-SSB blocks to determine a SL synchronization priority level for the S-SSB block.

Therefore, according to an example embodiment, a DM-RS signal of a S-SSB block may provide or indicate SL priority-related information for the S-SSB block. For example, a SL demodulation reference signal initialization value (SL DM-RS initialization value) may be generated or determined to provide (and may map to or correspond to) priority-related information for a S-SSB block. In an example embodiment, the SL DM-RS initialization value for a S-SSB block may indicate, may be associated with, and/or may map to one or more types of SL priority-related information or parameters for a S-SSB block. For example, a receiving UE that receives the S-SSB block (or a portion thereof) may determine the SL DM-RS initialization value based on the DM-RS, and may determine one or more of the SL priority-related information or parameters for the S-SSB block (e.g., depending on the configuration for the SL DM-RS initialization value and/or a mapping between the SL DM-RS initialization value and one or more SL priority-related information/parameters. In an example embodiment, the SL priority-related information or parameters determined by the receiving UE for the S-SSB block may be used by the receiving UE, e.g., to determine a SL synchronization priority level for the S-SSB block, and/or to determine whether the UE should decode the PSBCH and/or perform further processing based on the S-SSB block, and/or to determine whether the UE should use the S-SSB block for SL synchronization (as some examples).

For example, a demodulation reference signal (DM-RS) for a S-SSB block may be scrambled (or encoded, modulated or initialized) based on at least the SL DM-RS initialization value, such that the DM-RS may provide or communicate SL priority-related information or parameters for the S-SSB block. For example, if the SL DM-RS initialization value on which the DM-RS is based indicates that the S-SSB block has a lower priority than a receiving UE (that is receiving the S-SSB block and DM-RS) currently has or is seeking, then the receiving UE may elect not decode the PSBCH and/or may elect to discontinue processing of the S-SSB block, and may continue searching for another (e.g., higher priority)S-SSB block, for example.

Thus, for example, a S-SSB block that include a DM-RS that may be scrambled or initialized based on (or otherwise provide or communicate) a SL DM-RS initialization value to provide or communicate SL priority-related information to a receiving UE may allow the receiving UE to improve SL synchronization performance, e.g., by avoiding PSBCH decoding for some S-SSB blocks and/or reduce processing (and thus, save time and/or power) of some S-SSBs during its search for SL synchronization information (S-SSB blocks). Also, by having a DM-RS for the S-SSB block provide or convey or communicate SL priority-related information for the S-SSB, the receiving UE may be able to more effectively distinguish priority-related information, such as a SL synchronization priority level, for different S-SSB blocks.

According to an example embodiment, the P-PSS and S-SSS of the S-SSB may be associated with a physical sidelink identity (SL-ID) (or a range of SL-ID values), where SL-ID may also be referred to sometimes as SL-SSID. In an example embodiment, the DM-RS of the S-SSB block may be scrambled based on the SL DM-RS initialization value and the SL-ID for the S-SSB block.

According to an example embodiment, the DM-RS of the S-SSB block may be a pseudo-random sequence that is generated by a sequence generator, wherein the sequence generator is initialized based on at least the sidelink demodulation reference signal initialization value (SL DM-RS initialization value).

According to an example embodiment, the P-PSS and S-SSS of the S-SSB may be associated with a SL-ID (or a range of SL-ID values). In an example embodiment, the DM-RS of the S-SSB block may be a pseudo-random sequence that is generated by a sequence generator, wherein the sequence generator is initialized to $C_{init}$ based on the following:

$$C_{init} = 2^{11}(i_{init}^{SL}+1)(\lfloor N_{ID}^{SL}/4 \rfloor + 1) + 2^6(i_{init}^{SL}+1) + (N_{ID}^{SL} \mod 4) \quad \text{Eqn. 1}$$

Where $C_{init}$ is an initial state of the sequence generator to be used to generate the demodulation reference signal (DM-RS), and $i_{init}^{SL}$ is the sidelink demodulation reference signal initialization value (SL DM-RS initialization value) for the S-SSB, and $N_{ID}^{SL}$ is the physical layer sidelink identity (SL-ID) for the S-SSB.

According to an example embodiment, a DM-RS sequence r(m) for a S-SSB may be defined by:

$$r(m) = \frac{1}{\sqrt{2}}(1 - 2c(m)) + j\frac{1}{\sqrt{2}}(1 - 2c(m+1)) \quad \text{Eqn. 2}$$

Where, the DM-RS of the S-SSB block may be a pseudo-random sequence that is generated by a sequence generator, wherein the sequence generator is initialized to $c_{init}$ based on Eqn. 1 (see above), as an example, where $c_{init}$ is an initial state of the sequence generator to be used to generate the demodulation reference signal (DM-RS), and $i_{init}^{SL}$ is the sidelink demodulation reference signal initialization value (SL DM-RS initialization value) for the S-SSB, and $N_{ID}^{SL}$ is the physical layer sidelink identity (SL-ID) for the S-SSB. Thus, according to an illustrative example embodiment, the value c(m) within Eqn. 2 may be initialized to $c_{init}$, as shown by Eqn. 1, at the start of a S-SSB block.

Also, according to an example embodiment, a UE (e.g., a transmitting UE that transmits a S-SSB) may determine a SL DM-RS initialization value for a S-SSB, generate a pseudo-random sequence for the DM-RS that is initialized based at least on the SL DM-RS initialization value, and then transmit the S-SSB, including the DM-RS.

According to an example embodiment, the SL DM-RS initialization value may be based on (and thus, may indicate, communicate, provide or convey to a receiving UE) one or more types of SL priority-related information for the S-SSB, such as, for example: a SL synchronization priority level (e.g., P0, P1, P2, P3 . . . ) for the S-SSB; a synchronization source type (e.g., GNSS, eNB/gNB, UE, . . . ) for the transmitting UE, which may have different SL priorities; a SL resource (e.g., R1, R2, R3), of a plurality of SL resources, that is used for the transmission of the S-SSB, wherein different SL resource may have or may be associated with different SL priorities; and/or whether the physical sidelink broadcast channel (PSBCH) of the S-SSB is preconfigured or signaled by a gNB/BS (network signaled), wherein a network signaled PSBCH may have a higher priority than a preconfigured PSBCH. These are merely some examples of SL priority-related information for the S-SSB, and other SL priority-related information may be used.

Table 3 is an example of SL DM-RS initialization values that indicate or map to SL synchronization priority levels for a S-SSB. In this example shown in Table 3, a DM-RS may be provided (e.g., scrambled or a sequence generator for the DM-RS may be initialized) based on a SL DM-RS initialization value, which may be an index or value associated with or identifying a specific SL synchronization priority level. Thus, the receiving UE may determine the SL DM-RS initialization value for the received DM-RS, and then may use Table 3 to map the determined SL DM-RS initialization value to an associated SL synchronization priority level. For example, a DM-RS that indicates or provides a SL DM-RS initialization value of 1 would mean, based on Table 3, that the received S-SSB has a SL synchronization priority level of P1' or P1.

TABLE 3

| SL Synchronization Priority Level | SL DM-RS initialization value (SL DM-RS Init Value) |
|---|---|
| P0' or P0 | 0 |
| P1' or P1 | 1 |
| P2' or P2 | 2 |
| P3' or P3 | 3 |
| P4' or P4 | 4 |
| P5' or P5 | 5 |

TABLE 3-continued

| SL Synchronization Priority Level | SL DM-RS initialization value (SL DM-RS Init Value) |
|---|---|
| P6' or P6 | 6 |

Table 4 is an example of SL DM-RS initialization values for a S-SSB that indicate or map to a number of SL priority-related information for the S-SSB, e.g., including a synchronization source of the transmitting UE (the UE that is transmitting the S-SSB), a SL-ID of the S-SSB, and a SL synchronization priority level. In this example shown in Table 4, a DM-RS may be provided (e.g., scrambled or a sequence generator for the DM-RS may be initialized) based on a SL DM-RS initialization value, which may be an index or value associated with, for example, two rows of Table 4, wherein a SL-ID for the S-SSB may determine which row of SL priority-related information of Table 4 is provided for or associated with this S-SSB. For example, if a receiving UE receives a S-PSS S-SSS associated with a SL-ID of 1, and receives a DM-RS that provides or indicates a SL DM-RS initialization value of 0, then the first row of Table 4 provide SL priority-related information for this S-SSB (e.g., synchronization source of gNB/eNB, SL synchronization priority of P0' or P3). Thus, as shown in the example of Table 4, in some cases, the SL DM-RS initialization value may indicate a subset of priority information (e.g., two rows within Table 4) that are applicable or for a S-SSB, which may be further narrowed to a specific row or set of information based on the SL-ID, for example, or vice-versa.

TABLE 4

| Synch. Source of UE | SL-ID | SL Synch. Priority Level | SL DM-RS Initialization Value |
|---|---|---|---|
| gNB/eNB | [1, 335] | P0' + P3 | 0 |
| UE(1-hop gNB/eNB) | [1, 335] | P1' + P4 | 1 |
| UE(≥2-hop gNB/eNB) | [337, 671] | P2' + P5 | 2 |
| GNSS | 0 | P0 + P3' | 0 |
| UE(1-hop GNSS) | 336 | P1 + P4' | 1 |
| UE(≥2-hop GNSS) | 337 | P2 + P5' | 2 |
| none (SA) | [338, 671] | P6 + P6' | 3 |

Table 5 is an example where the SL DM-RS initialization value may indicate at least whether the physical sidelink broadcast channel (PSBCH) of the S-SSB is preconfigured or signaled by a gNB/BS (network signaled). In this example, a value of 0 for the SL DM-RS initialization value indicates that the PSBCH is signalled by the gNB/BS (network signalled) (which is higher priority), whereas a value of 1 for the SL DM-RS initialization value indicates that the PSBCH is preconfigured (lower priority).

TABLE 5

| Synch. Source of UE | SL-ID | SL Synch. Priority Level | SL DM-RS Initialization Value |
|---|---|---|---|
| gNB/eNB | [1, 335] | P0' + P3 | 0 (PSBCH signalled by gNB/network) |
| UE(1-hop gNB/eNB) | [1, 335] | P1' + P4 | 0 (PSBCH signalled) |
| UE(≥2-hop gNB/eNB) | [337, 671] | P2' + P5 | 0 (signalled) |
| GNSS | 0 | P0 + P3' | 1 (preconfigured PSBCH) |
| UE(1-hop | 336 | P1 + P4' | 1 (preconfigured |

TABLE 5-continued

| Synch. Source of UE | SL-ID | SL Synch. Priority Level | SL DM-RS Initialization Value |
|---|---|---|---|
| GNSS) | | | PSBCH) |
| UE(≥2-hop GNSS) | 337 | P2 + P5' | 1 (preconfigured PSBCH) |
| none (SA—stand alone) | [338, 671] | P6 + P6' | 1 (preconfigured PSBCH) |

Table 6 is an example where the SL DM-RS initialization value may indicate the SL resource that is used to transmit the S-SSB. For example, a UE may select the time resource configuration (e.g., R1, R2, or R3) for S-SSB transmission, e.g., based on the SL synchronization priority level for the S-SSB. Thus, for example, the time resource configuration (e.g., R1, R2, R3) used to transmit the S-SSB may be used to select the SL DMR-S initialization value. For example, SL DM-RS initialization values of 0, 1, and 2 may correspond to SL resources R1, R2, and R3, respectively.

TABLE 6

| SL Resource | SL DM-RS Initialization Value |
|---|---|
| sl-SSB-TimeAllocation1-r16 (R1) | 0 |
| sl-SSB-TimeAllocation2-r16 (R2) | 1 |
| sl-SSB-TimeAllocation3-r16 (R3) | 2 |

Figure 3:
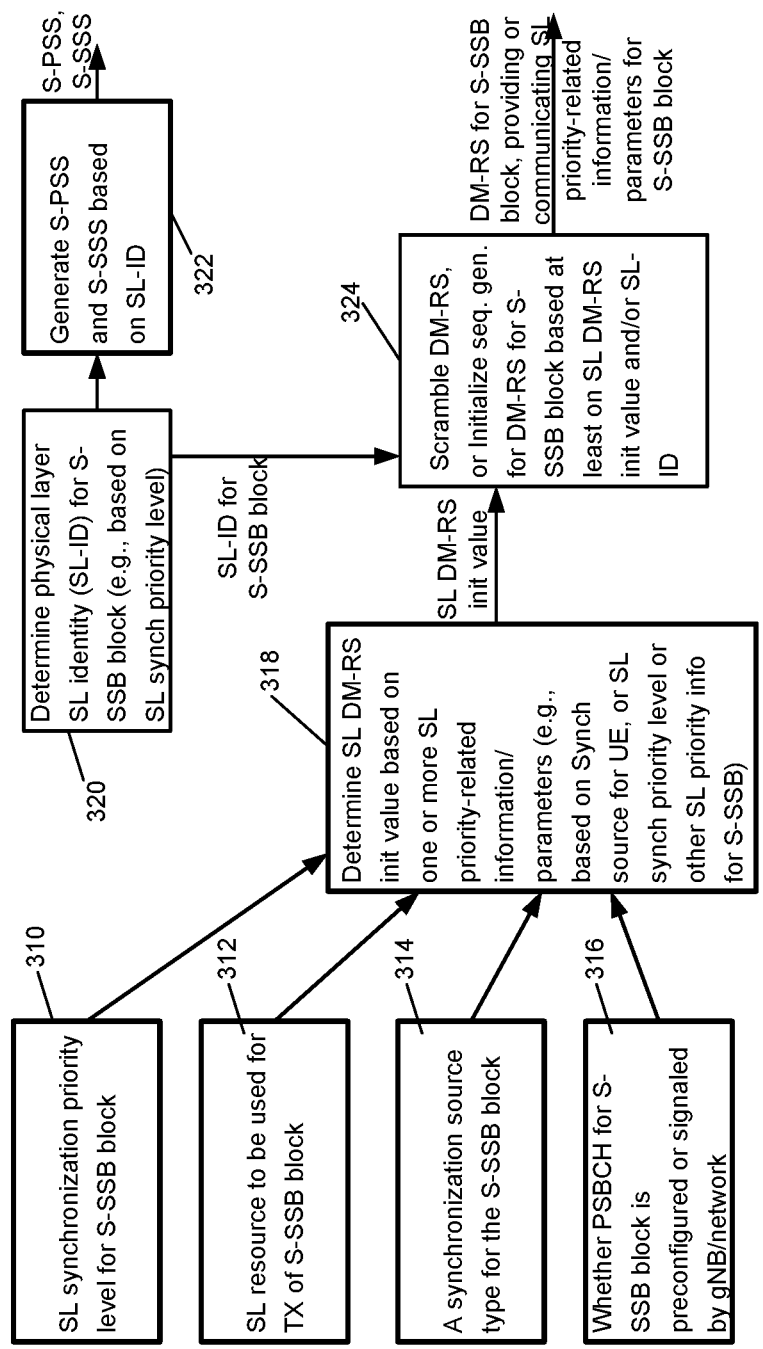
FIG. 3 is a diagram illustrating some operations that may be performed by a user equipment to generate at least a portion of a sidelink synchronization signal (S-SSB) block according to an example embodiment.

FIG. 3 is a diagram illustrating some operations that may be performed by a user equipment to generate a sidelink synchronization signal (S-SSB) block according to an example embodiment. At 318, a UE may determine a SL DM-RS initialization value, e.g., based on one or more SL priority-related information/parameters (which may also be referred to as SL synchronization priority-related information/parameters), such as based on a synchronization source for the UE or a SL synchronization priority level for the S-SSB block to be transmitted. For example, the SL DM-RS initialization value may be determined at 318 based on (and thus, may indicate, communicate, provide or convey to a receiving UE) one or more types of SL priority-related information for the S-SSB, such as, for example: at 310, a SL synchronization priority level (e.g., P0, P1, P2, P3 . . . ) for the S-SSB; at 314, a synchronization source type (e.g., GNSS, eNB/gNB, UE, . . . ) for the transmitting UE, which may have different SL priorities; at 312, a SL resource (e.g., R1, R2, R3), of a plurality of SL resources, that is used for the transmission of the S-SSB, wherein different SL resource may have or may be associated with different SL priorities; and/or at 316, whether the physical sidelink broadcast channel (PSBCH) of the S-SSB is preconfigured or signaled by a gNB/BS (network signaled), wherein a network signaled PSBCH may have a higher priority than a preconfigured PSBCH. These are merely some examples of SL priority-related information for the S-SSB, and other SL priority-related information may be used.

At 320, the UE may determine a physical layer SL identity (SL-ID) for the S-SSB block. At 324, the UE may scramble the DM-RS, or may initialize a sequence generator for the DM-RS, based on at least the SL DM-RS initialization value (or based on the SL DM-RS initialization value and the SL-ID), and output the DM-RS for the S-SSB to be transmitted. At 322, the UE may generate the S-PSS and S-SSS based on the SL-ID.

Figure 4:
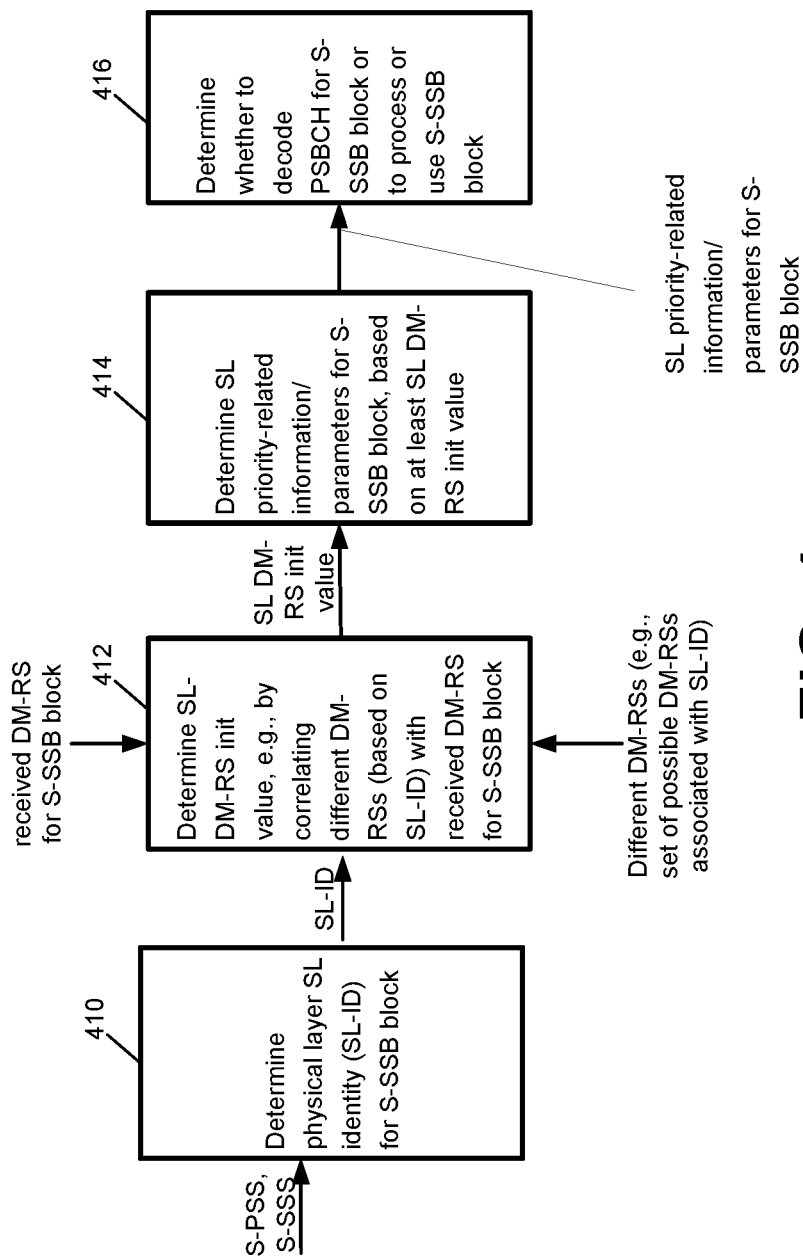
FIG. 4 is a diagram illustrating some operations that may be performed by a user equipment to receive and/or process at least a portion of a sidelink synchronization signal (S-SSB) block according to an example embodiment.

FIG. 4 is a diagram illustrating some operations that may be performed by a user equipment to receive and/or process at least a portion of a sidelink synchronization signal (S-SSB) block according to an example embodiment. At 410, the receiving UE may receive the S-PSS and S-SSS and determine the SL-ID based on these. At 412, the UE may receive the DM-RS for the S-SSB block, and may determine a SL DM-RS initialization value based on the DM-RS. For example, the UE may narrow down a list of possible DM-RS values based on the SL-ID for the S-SSB, and may then correlate one or more of the possible DM-RSs with the received DM-RS for the S-SSB, until a correlation peak is indicated, or a match is found, which reveals the SL DM-RS initialization value to the receiving UE. Alternatively, different possible DM-RSs may be used to perform channel estimation, and then PBSCH may be decoded to obtain a CRC, to find a DM-RS that the CRC computes or detects no errors, for example. At 414, the receiving UE may determine the SL priority-related information based on the SL DM-RS initialization value (and/or based on the SL-ID), e.g., such as by using a lookup table, such as any of Tables 3, 4, 5 or 6, as illustrative examples. At 416, the UE may then determine, e.g., based on the one or more SL priority-related information or parameters determined from the DM-RS for this S-SSB, whether to decode the PSBCH, and/or whether to further process or use this S-SSB for SL synchronization.

Figure 5:
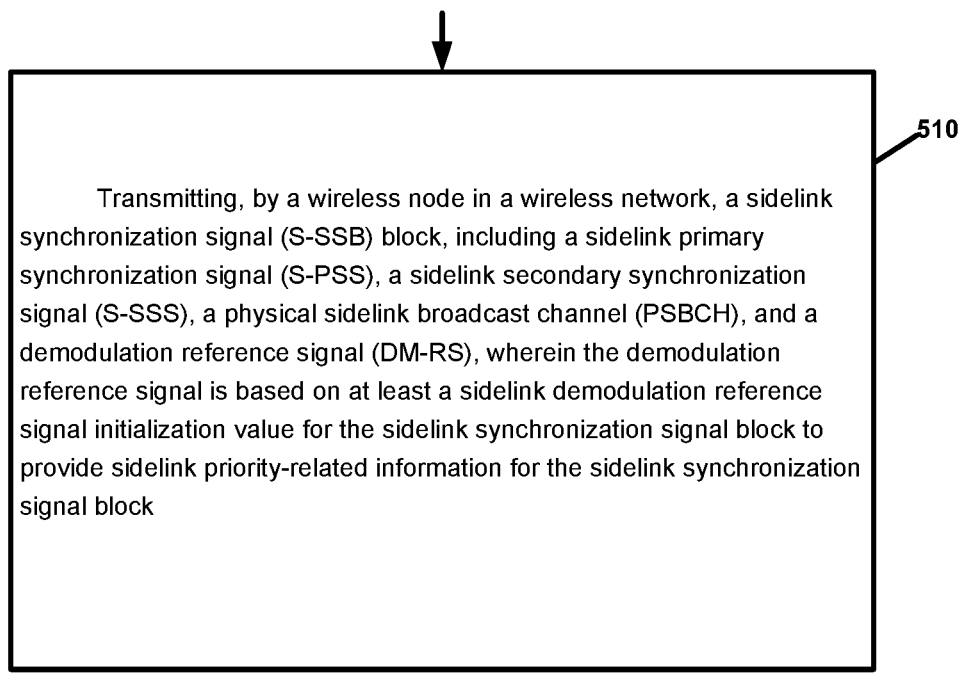
FIG. 5 is a flow chart illustrating operation of a user equipment according to an example embodiment.

Example 1. FIG. 5 is a flow chart illustrating operation of a wireless node (e.g., user equipment (UE)) according to an example embodiment. Operation 510 includes transmitting, by a wireless node in a wireless network, a sidelink synchronization signal (S-SSB) block, including a sidelink primary synchronization signal (S-PSS), a sidelink secondary synchronization signal (S-SSS), a physical sidelink broadcast channel (PSBCH), and a demodulation reference signal (DM-RS), wherein the demodulation reference signal is based on at least a sidelink demodulation reference signal initialization value for the sidelink synchronization signal block to provide sidelink priority-related information for the sidelink synchronization signal block.

Example 2. The method of Example 1, wherein the sidelink demodulation reference signal initialization value for the sidelink synchronization signal block indicates a sidelink synchronization priority level for the sidelink synchronization signal block.

Example 3. The method of Example 2, wherein each different sidelink synchronization priority level, of a plurality of sidelink synchronization priority levels, is indicated by a demodulation reference signal that is based on at least a different sidelink demodulation reference signal initialization value.

Example 4. The method of any of Examples 1-3, wherein the sidelink primary synchronization signal and the sidelink secondary synchronization signal are associated with a physical layer sidelink identity (SL-ID); and wherein a sidelink synchronization priority level for the sidelink synchronization signal block is associated with the sidelink demodulation reference signal initialization value for the sidelink synchronization signal block and the physical layer sidelink identity.

Example 5. The method of any of Examples 1-4, wherein the sidelink demodulation reference signal initialization value for the sidelink synchronization signal block is based on at least a sidelink resource, of a plurality of sidelink resources, that is used for the transmission of the sidelink synchronization signal block.

Example 6. The method of Example 5, wherein different sidelink resources of the plurality of sidelink resources are provided for transmission of sidelink synchronization signal blocks having different sidelink synchronization priority levels.

Example 7. The method of any of Examples 1-6, wherein the sidelink demodulation reference signal initialization value for the sidelink synchronization signal block is based on at least a synchronization source type for the wireless node, wherein different synchronization source types have different sidelink synchronization priority levels.

Example 8. The method of any of Examples 1-7, wherein the sidelink demodulation reference signal initialization value for the sidelink synchronization signal block indicates whether a contents of physical sidelink broadcast channel (PSBCH) of the sidelink synchronization signal block is preconfigured or signaled by a base station to the wireless node.

Example 9. The method of any of Examples 1-8, wherein the demodulation reference signal of the sidelink synchronization signal block is scrambled based on at least the sidelink demodulation reference signal initialization value.

Example 10. The method of any of Examples 1-9, wherein the sidelink primary synchronization signal and the sidelink secondary synchronization signal are associated with a physical layer sidelink identity (SL-ID); and wherein the demodulation reference signal of the sidelink synchronization signal block is scrambled based on at least the sidelink demodulation reference signal initialization value and the physical layer sidelink identity.

Example 11. The method of any of Examples 1-10, wherein the demodulation reference signal of the sidelink synchronization signal block is a sequence that is generated by a sequence generator, wherein the sequence generator is initialized based on at least the sidelink demodulation reference signal initialization value, such that the demodulation reference signal indicates priority-related information for the sidelink synchronization signal block.

Example 12. The method of any of Examples 1-11, wherein the sidelink primary synchronization signal and the sidelink secondary synchronization signal are associated with a physical layer sidelink identity (SL-ID); wherein the demodulation reference signal (DM-RS) of the sidelink synchronization signal block (S-SSB) is a pseudo-random sequence that is generated by a sequence generator, wherein the sequence generator is initialized to $c_{init}$ based on the following:

$$c_{init}=2^{11}(i_{init}^{SL}+1)([N_{ID}^{SL}/4]+1)+2^6(i_{init}^{SL}+1)+(N_{ID}^{SL} \bmod 4)$$

Where $c_{init}$ is an initial state of the sequence generator to be used to generate the demodulation reference signal, and $i_{init}^{SL}$ is the sidelink demodulation reference signal initialization value for the sidelink synchronization signal block, and $N_{ID}^{SL}$ is the physical layer sidelink identity for the sidelink synchronization signal block.

Example 13. The method of claim 1 (or of any of claims 1-12), further comprising: determining, by the wireless node, the sidelink demodulation reference signal initialization value for the sidelink synchronization signal block; generating a pseudo-random sequence for demodulation reference signal that is initialized based at least on the sidelink demodulation reference signal initialization value; and wherein the transmitting comprises transmitting the sidelink synchronization signal block including the demodulation reference signal.

Example 14. The method of Example 13, wherein the determining the sidelink demodulation reference signal initialization value for the sidelink synchronization signal block is performed based on one or more of the following: a sidelink synchronization priority level for the sidelink synchronization signal block; a synchronization source type for the wireless node; a sidelink resource, of a plurality of sidelink resources, that is used for the transmission of the sidelink synchronization signal block; or whether the physical sidelink broadcast channel (PSBCH) of the sidelink synchronization signal block is preconfigured or signaled by a base station to the wireless node.

Example 15. The method of any of Examples 1-14, wherein the wireless node comprises a user equipment.

Example 16. An apparatus comprising means for performing the method of any of Examples 1-15.

Example 17. A non-transitory computer-readable storage medium comprising instructions stored thereon that, when executed by at least one processor, are configured to cause a computing system to perform the method of any of Examples 1-15.

Example 18. An apparatus comprising: at least one processor; and at least one memory including computer program code; the at least one memory and the computer program code configured to, with the at least one processor, cause the apparatus at least to perform the method of any of Examples 1-15.

Figure 6:
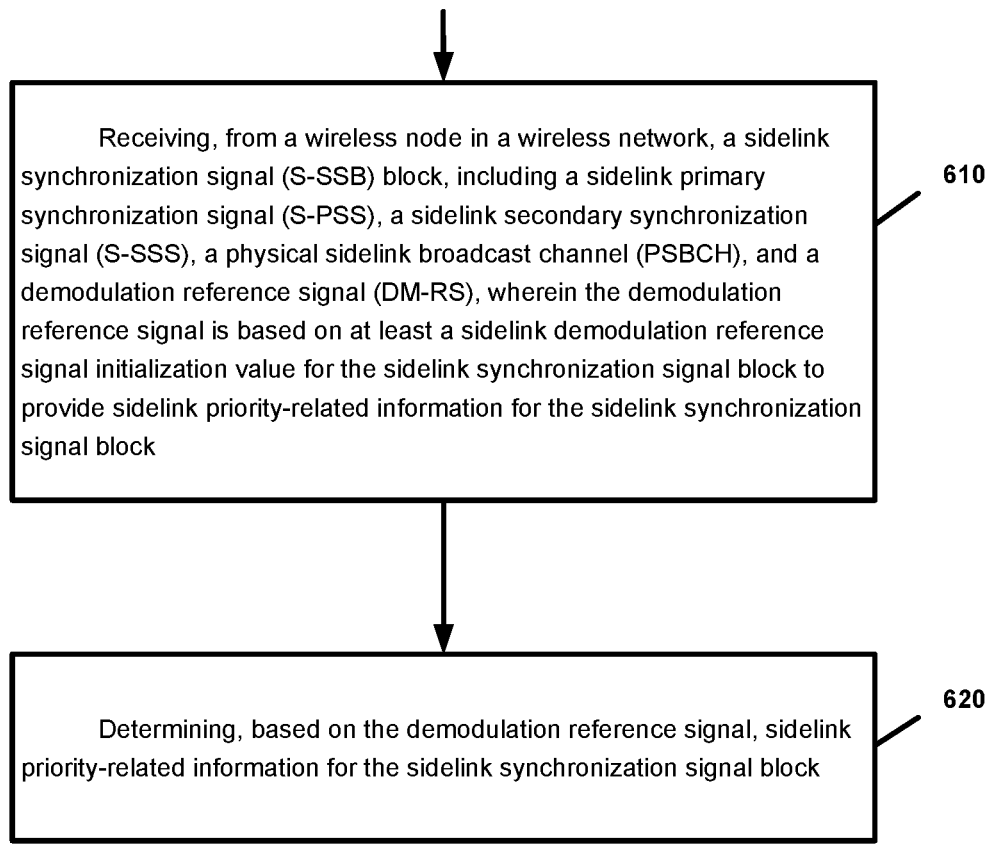
FIG. 6 is a flow chart illustrating operation of a user equipment according to another example embodiment.

Example 19. FIG. 6 is a flow chart illustrating operation of a wireless node (e.g., user equipment) according to another example embodiment. Operation 610 includes receiving, from a wireless node in a wireless network, a sidelink synchronization signal (S-SSB) block, including a sidelink primary synchronization signal (S-PSS), a sidelink secondary synchronization signal (S-SSS), a physical sidelink broadcast channel (PSBCH), and a demodulation reference signal (DM-RS), wherein the demodulation reference signal is based on at least a sidelink demodulation reference signal initialization value for the sidelink synchronization signal block to provide sidelink priority-related information for the sidelink synchronization signal block. And, operation 620 includes determining, based at least in part on the demodulation reference signal, sidelink priority-related information for the sidelink synchronization signal block.

Example 20. The method of Example 19, wherein the determining sidelink priority-related information for the sidelink synchronization signal block comprises determining at least one of the following based on at least the demodulation reference signal: a sidelink synchronization priority level for the sidelink synchronization signal block; a synchronization source type for the wireless node; a sidelink resource, of a plurality of sidelink resources, that is used for the transmission of the sidelink synchronization signal block; or whether the physical sidelink broadcast channel (PSBCH) of the sidelink synchronization signal block is preconfigured or signaled by a base station to the wireless node.

Example 21. The method of any of Examples 19-20, wherein the determining sidelink priority-related information comprises: determining a sidelink synchronization priority level for the sidelink synchronization signal block based on the sidelink demodulation reference signal initialization value for the sidelink synchronization signal block.

Example 22. The method of any of Examples 19-21, wherein each different sidelink synchronization priority level, of a plurality of sidelink synchronization priority levels, is determined based on at least a different sidelink demodulation reference signal initialization value.

Example 23. The method of any of Examples 19-22, comprising: determining a physical layer sidelink identity (SL-ID) based on the sidelink primary synchronization signal and the sidelink secondary synchronization signal; wherein the determining sidelink priority-related information comprises: determining a sidelink synchronization priority level for the sidelink synchronization signal block based on: 1) the physical layer sidelink identity and 2) the sidelink demodulation reference signal initialization value that is determined based on the demodulation reference signal.

Example 24. The method of any of Examples 19-23, wherein the determining sidelink priority-related information for the sidelink synchronization signal block comprises: determining, based on at least the sidelink demodulation reference signal initialization value, a sidelink resource, of a plurality of sidelink resources, that is used for the transmission of the sidelink synchronization signal block, wherein different sidelink resources are associated with different sidelink synchronization priority levels.

Example 25. The method of any of Examples 19-24, wherein the determining sidelink priority-related information for the sidelink synchronization signal block comprises: determining, based on at least the sidelink demodulation reference signal initialization value, a synchronization source type for the wireless node, wherein different synchronization source types have different sidelink synchronization priority levels.

Example 26. The method of any of Examples 19-25, wherein the determining sidelink priority-related information for the sidelink synchronization signal block comprises: determining, based on at least the sidelink demodulation reference signal initialization value, whether a contents of the physical sidelink broadcast channel (PSBCH) of the sidelink synchronization signal block is preconfigured or signaled by a base station to the wireless node.

Example 27. The method of any of Examples 19-26, wherein the demodulation reference signal of the sidelink synchronization signal block is scrambled based on at least the sidelink demodulation reference signal initialization value.

Example 28. The method of any of Examples 19-27, wherein the sidelink primary synchronization signal and the sidelink secondary synchronization signal are associated with a physical layer sidelink identity (SL-ID); and wherein the demodulation reference signal of the sidelink synchronization signal block is scrambled based on at least the sidelink demodulation reference signal initialization value and the physical layer sidelink identity.

Example 29. The method of any of Examples 19-28, wherein the demodulation reference signal of the sidelink synchronization signal block is a sequence that is generated by a sequence generator, wherein the sequence generator is initialized based on at least the sidelink demodulation reference signal initialization value, such that the demodulation reference signal indicates priority-related information for the sidelink synchronization signal block.

Example 30. The method of any of Examples 19-29, wherein the sidelink primary synchronization signal and the sidelink secondary synchronization signal are associated with a physical layer sidelink identity (SL-ID); and wherein the demodulation reference signal of the sidelink synchronization signal block is a sequence that is generated by a sequence generator, wherein the sequence generator is initialized based on at least the sidelink demodulation reference signal initialization value and the physical layer sidelink identity, such that the demodulation reference signal indicates priority-related information for the sidelink synchronization signal block.

Example 31. The method of any of Examples 19-30, comprising: determining a physical layer sidelink identity (SL-ID) based on the sidelink primary synchronization signal and the sidelink secondary synchronization signal;

determining at least the sidelink demodulation reference signal initialization value based on the demodulation reference signal for the sidelink synchronization signal block; determining, based on the physical layer sidelink identity and the sidelink demodulation reference signal initialization value, the sidelink priority-related information for the sidelink synchronization signal block, wherein the sidelink priority-related information for the sidelink synchronization signal block maps to a combination of the physical layer sidelink identity and the sidelink demodulation reference signal initialization value.

Example 32. The method of any of Examples 19-31, wherein the wireless node comprises a user equipment.

Example 33. An apparatus comprising means for performing the method of any of Examples 19-32.

Example 34. A non-transitory computer-readable storage medium comprising instructions stored thereon that, when executed by at least one processor, are configured to cause a computing system to perform the method of any of Examples 19-32.

Example 35. An apparatus comprising: at least one processor; and at least one memory including computer program code; the at least one memory and the computer program code configured to, with the at least one processor, cause the apparatus at least to perform the method of any of Examples 19-32.

Figure 7:
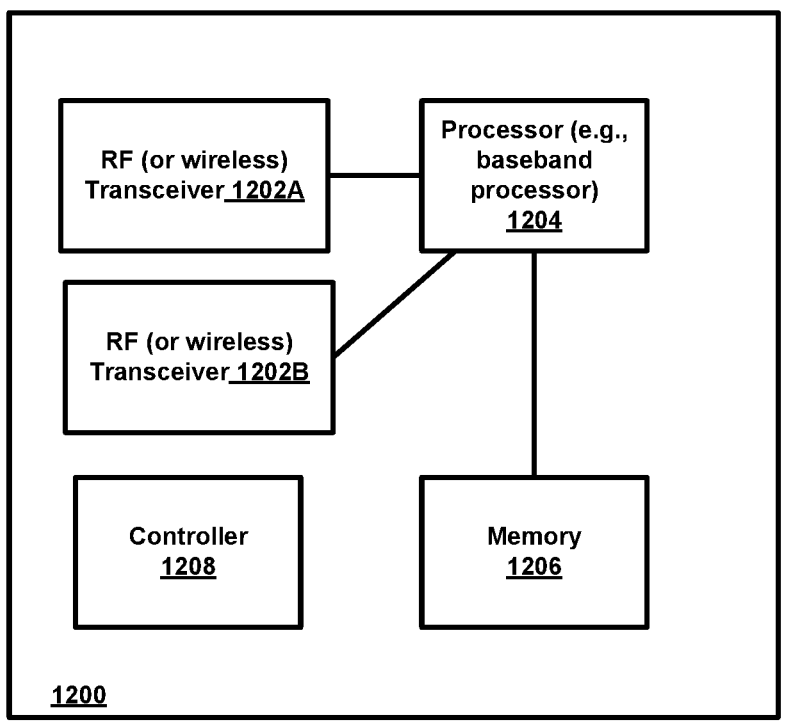
FIG. 7 is a block diagram of a wireless station (e.g., AP, BS, RAN node, UE or user device, or other network node) according to an example embodiment.

FIG. 7 is a block diagram of a wireless station (e.g., AP, BS or user device/UE, or another network node) 1200 according to an example embodiment. The wireless station 1200 may include, for example, one or more (e.g., two as shown in FIG. 7) RF (radio frequency) or wireless transceivers 1202A, 1202B, where each wireless transceiver includes a transmitter to transmit signals and a receiver to receive signals. The wireless station also includes a processor or control unit/entity (controller) 1204 to execute instructions or software and control transmission and receptions of signals, and a memory 1206 to store data and/or instructions.

Processor 1204 may also make decisions or determinations, generate frames, packets or messages for transmission, decode received frames or messages for further processing, and other tasks or functions described herein. Processor 1204, which may be a baseband processor, for example, may generate messages, packets, frames or other signals for transmission via wireless transceiver 1202 (1202A or 1202B). Processor 1204 may control transmission of signals or messages over a wireless network, and may control the reception of signals or messages, etc., via a wireless network (e.g., after being down-converted by wireless transceiver 1202, for example). Processor 1204 may be programmable and capable of executing software or other instructions stored in memory or on other computer media to perform the various tasks and functions described above, such as one or more of the tasks or methods described above. Processor 1204 may be (or may include), for example, hardware, programmable logic, a programmable processor that executes software or firmware, and/or any combination of these. Using other terminology, processor 1204 and transceiver 1202 together may be considered as a wireless transmitter/receiver system, for example.

In addition, referring to FIG. 7, a controller (or processor) 1208 may execute software and instructions, and may provide overall control for the station 1200, and may provide control for other systems not shown in FIG. 7, such as controlling input/output devices (e.g., display, keypad), and/or may execute software for one or more applications that may be provided on wireless station 1200, such as, for example, an email program, audio/video applications, a word processor, a Voice over IP application, or other application or software.

In addition, a storage medium may be provided that includes stored instructions, which when executed by a controller or processor may result in the processor 1204, or other controller or processor, performing one or more of the functions or tasks described above.

According to another example embodiment, RF or wireless transceiver(s) 1202A/1202B may receive signals or data and/or transmit or send signals or data. Processor 1204 (and possibly transceivers 1202A/1202B) may control the RF or wireless transceiver 1202A or 1202B to receive, send, broadcast or transmit signals or data.

The embodiments are not, however, restricted to the system that is given as an example, but a person skilled in the art may apply the solution to other communication systems. Another example of a suitable communications system is the 5G system. It is assumed that network architecture in 5G will be quite similar to that of the LTE-advanced. 5G is likely to use multiple input—multiple output (MIMO) antennas, many more base stations or nodes than the LTE (a so-called small cell concept), including macro sites operating in co-operation with smaller stations and perhaps also employing a variety of radio technologies for better coverage and enhanced data rates.

It should be appreciated that future networks will most probably utilise network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations may be carried out, at least partly, in a server, host or node operationally coupled to a remote radio head. It is also possible that node operations will be distributed among a plurality of servers, nodes or hosts. It should also be understood that the distribution of labour between core network operations and base station operations may differ from that of the LTE or even be non-existent.

Embodiments of the various techniques described herein may be implemented in digital electronic circuitry, or in computer hardware, firmware, software, or in combinations of them. Embodiments may be implemented as a computer program product, i.e., a computer program tangibly embodied in an information carrier, e.g., in a machine-readable storage device or in a propagated signal, for execution by, or to control the operation of, a data processing apparatus, e.g., a programmable processor, a computer, or multiple computers. Embodiments may also be provided on a computer readable medium or computer readable storage medium, which may be a non-transitory medium. Embodiments of the various techniques may also include embodiments provided via transitory signals or media, and/or programs and/or software embodiments that are downloadable via the Internet or other network(s), either wired networks and/or wireless networks. In addition, embodiments may be provided via machine type communications (MTC), and also via an Internet of Things (JOT).

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers.

Furthermore, embodiments of the various techniques described herein may use a cyber-physical system (CPS) (a system of collaborating computational elements controlling physical entities). CPS may enable the embodiment and exploitation of massive amounts of interconnected ICT devices (sensors, actuators, processors microcontrollers, . . . ) embedded in physical objects at different locations. Mobile cyber physical systems, in which the physical system in question has inherent mobility, are a subcategory of cyber-physical systems. Examples of mobile physical systems include mobile robotics and electronics transported by humans or animals. The rise in popularity of smartphones has increased interest in the area of mobile cyber-physical systems. Therefore, various embodiments of techniques described herein may be provided via one or more of these technologies.

A computer program, such as the computer program(s) described above, can be written in any form of programming language, including compiled or interpreted languages, and can be deployed in any form, including as a stand-alone program or as a module, component, subroutine, or other unit or part of it suitable for use in a computing environment. A computer program can be deployed to be executed on one computer or on multiple computers at one site or distributed across multiple sites and interconnected by a communication network.

Method steps may be performed by one or more programmable processors executing a computer program or computer program portions to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer, chip or chipset. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, embodiments may be implemented on a computer having a display device, e.g., a cathode ray tube (CRT) or liquid crystal display (LCD) monitor, for displaying information to the user and a user interface, such as a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments may be implemented in a computing system that includes a back-end component, e.g., as a data server, or that includes a middleware component, e.g., an application server, or that includes a front-end component, e.g., a client computer having a graphical user interface or a Web browser through which a user can interact with an embodiment, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described embodiments have been illustrated as described herein, many modifications, substitutions, changes and equivalents will now occur to those skilled in the art. It is, therefore, to be understood that the appended claims are intended to cover all such modifications and changes as fall within the true spirit of the various embodiments.

What is claimed is:

1. A method comprising:
   transmitting, by a wireless node in a wireless network, a sidelink synchronization signal (S-SSB) block, including a sidelink primary synchronization signal (S-PSS), a sidelink secondary synchronization signal (S-SSS), a physical sidelink broadcast channel (PSBCH), and a demodulation reference signal (DM-RS), wherein the demodulation reference signal is based on at least a sidelink demodulation reference signal initialization value for the sidelink synchronization signal block to provide sidelink priority-related information for the sidelink synchronization signal block;
   wherein the sidelink primary synchronization signal and the sidelink secondary synchronization signal are associated with a physical layer sidelink identity (SL-ID);
   wherein the demodulation reference signal (DM-RS) of the sidelink synchronization signal block (S-SSB) is a pseudo-random sequence that is generated by a sequence generator, wherein the sequence generator is initialized to $c_{init}$ based on the following:

$$C_{init} = 2^{11}(i_{init}^{SL}+1)(\lfloor N_{ID}^{SL}/4 \rfloor + 1) + 2^6(i_{init}^{SL}+1) + (N_{ID}^{SL} \mod 4)$$

where $c_{init}$ is an initial state of the sequence generator to be used to generate the demodulation reference signal, and $i_{init}^{SL}$ is the sidelink demodulation reference signal initialization value for the sidelink synchronization signal block, and $N_{ID}^{SL}$ is the physical layer sidelink identity for the sidelink synchronization signal block.

2. The method of claim 1, wherein the sidelink demodulation reference signal initialization value for the sidelink synchronization signal block indicates a sidelink synchronization priority level for the sidelink synchronization signal block.

3. The method of claim 2, wherein each different sidelink synchronization priority level, of a plurality of sidelink synchronization priority levels, is indicated by a demodulation reference signal that is based on at least a different sidelink demodulation reference signal initialization value.

4. The method of claim 1, wherein the sidelink primary synchronization signal and the sidelink secondary synchronization signal are associated with a physical layer sidelink identity (SL-ID); and
   wherein a sidelink synchronization priority level for the sidelink synchronization signal block is associated with the sidelink demodulation reference signal initialization value for the sidelink synchronization signal block and the physical layer sidelink identity.

5. The method of claim 1, wherein the sidelink demodulation reference signal initialization value for the sidelink synchronization signal block is based on at least a sidelink resource, of a plurality of sidelink resources, that is used for the transmission of the sidelink synchronization signal block.

6. The method of claim 5, wherein different sidelink resources of the plurality of sidelink resources are provided for transmission of sidelink synchronization signal blocks having different sidelink synchronization priority levels.

7. The method of claim 1, wherein the sidelink demodulation reference signal initialization value for the sidelink synchronization signal block is based on at least a synchronization source type for the wireless node, wherein different synchronization source types have different sidelink synchronization priority levels.

8. The method of claim 1, wherein the sidelink demodulation reference signal initialization value for the sidelink synchronization signal block indicates whether a contents of physical sidelink broadcast channel (PSBCH) of the sidelink synchronization signal block is preconfigured or signaled by a base station to the wireless node.

9. The method of claim 1, wherein the demodulation reference signal of the sidelink synchronization signal block is scrambled based on at least the sidelink demodulation reference signal initialization value.

10. The method of claim 1, wherein the sidelink primary synchronization signal and the sidelink secondary synchronization signal are associated with a physical layer sidelink identity (SL-ID); and
    wherein the demodulation reference signal of the sidelink synchronization signal block is scrambled based on at least the sidelink demodulation reference signal initialization value and the physical layer sidelink identity.

11. The method of claim 1, wherein the demodulation reference signal of the sidelink synchronization signal block is a sequence that is generated by a sequence generator, wherein the sequence generator is initialized based on at least the sidelink demodulation reference signal initialization value, such that the demodulation reference signal indicates priority-related information for the sidelink synchronization signal block.

12. The method of claim 1, further comprising:
    determining, by the wireless node, the sidelink demodulation reference signal initialization value for the sidelink synchronization signal block;
    generating a pseudo-random sequence for demodulation reference signal that is initialized based at least on the sidelink demodulation reference signal initialization value; and
    wherein the transmitting comprises transmitting the sidelink synchronization signal block including the demodulation reference signal.

13. The method of claim 12, wherein the determining the sidelink demodulation reference signal initialization value for the sidelink synchronization signal block is performed based on one or more of the following:
a sidelink synchronization priority level for the sidelink synchronization signal block;
a synchronization source type for the wireless node;
a sidelink resource, of a plurality of sidelink resources, that is used for the transmission of the sidelink synchronization signal block; or
whether the physical sidelink broadcast channel (PSBCH) of the sidelink synchronization signal block is preconfigured or signaled by a base station to the wireless node.

14. The method of claim 1, wherein the wireless node comprises a user equipment.

15. An apparatus comprising:
at least one processor; and
at least one memory including computer program code;
the at least one memory and the computer program code configured to, with the at least one processor, cause the apparatus at least to:
transmit a sidelink synchronization signal (S-SSB) block, including a sidelink primary synchronization signal (S-PSS), a sidelink secondary synchronization signal (S-SSS), a physical sidelink broadcast channel (PSBCH), and a demodulation reference signal (DM-RS), wherein the demodulation reference signal is based on at least a sidelink demodulation reference signal initialization value for the sidelink synchronization signal block to provide sidelink priority-related information for the sidelink synchronization signal block;
wherein the sidelink primary synchronization signal and the sidelink secondary synchronization signal are associated with a physical layer sidelink identity (SL-ID);
wherein the demodulation reference signal (DM-RS) of the sidelink synchronization signal block (S-SSB) is a pseudo-random sequence that is generated by a sequence generator, wherein the sequence generator is initialized to $c_{init}$ based on the following:

$$C_{init}=2^{11}(i_{init}^{SL}+1)(\lfloor N_{ID}^{SL}/4 \rfloor+1)+2^6(i_{init}^{SL}+1)+(N_{ID}^{SL} \mod 4)$$

where $c_{init}$ is an initial state of the sequence generator to be used to generate the demodulation reference signal, and $i_{init}^{SL}$ is the sidelink demodulation reference signal initialization value for the sidelink synchronization signal block, and $N_{ID}^{SL}$ is the physical layer sidelink identity for the sidelink synchronization signal block.

16. An apparatus comprising:
at least one processor; and
at least one memory including computer program code;
the at least one memory and the computer program code configured to, with the at least one processor, cause the apparatus at least to perform:
receive, from a wireless node in a wireless network, a sidelink synchronization signal (S-SSB) block, including a sidelink primary synchronization signal (S-PSS), a sidelink secondary synchronization signal (S-SSS), a physical sidelink broadcast channel (PSBCH), and a demodulation reference signal (DM-RS), wherein the demodulation reference signal is based on at least a sidelink demodulation reference signal initialization value for the sidelink synchronization signal block to provide sidelink priority-related information for the sidelink synchronization signal block; and
determine, based at least in part on the demodulation reference signal, sidelink priority-related information for the sidelink synchronization signal block;
wherein the sidelink primary synchronization signal and the sidelink secondary synchronization signal are associated with a physical layer sidelink identity (SL-ID);
wherein the demodulation reference signal (DM-RS) of the sidelink synchronization signal block (S-SSB) is a pseudo-random sequence that is generated by a sequence generator, wherein the sequence generator is initialized to $C_{init}$ based on the following:

$$C_{init}=2^{11}(i_{init}^{SL}+1)(\lfloor N_{ID}^{SL}/4 \rfloor+1)+2^6(i_{init}^{SL}+1)+(N_{ID}^{SL} \mod 4)$$

where $C_{init}$ is an initial state of the sequence generator to be used to generate the demodulation reference signal, and $i_{init}^{SL}$ is the sidelink demodulation reference signal initialization value for the sidelink synchronization signal block, and $N_{ID}^{SL}$ is the physical layer sidelink identity for the sidelink synchronization signal block.

17. The apparatus of claim 16, wherein the at least one processor and the computer program code configured to cause the apparatus to determine sidelink priority-related information for the sidelink synchronization signal block comprises the at least one processor and the computer program code configured to cause the apparatus to determine at least one of the following based on at least the demodulation reference signal:
a sidelink synchronization priority level for the sidelink synchronization signal block;
a synchronization source type for the wireless node;
a sidelink resource, of a plurality of sidelink resources, that is used for the transmission of the sidelink synchronization signal block; or
whether the physical sidelink broadcast channel (PSBCH) of the sidelink synchronization signal block is preconfigured or signaled by a base station to the wireless node.

18. The method of claim 16, wherein the at least one processor and the computer program code configured to cause the apparatus to determine sidelink priority-related information comprises the at least one processor and the computer program code configured to cause the apparatus to:
determine a sidelink synchronization priority level for the sidelink synchronization signal block based on the sidelink demodulation reference signal initialization value for the sidelink synchronization signal block.

19. The apparatus of claim 16, wherein each different sidelink synchronization priority level, of a plurality of sidelink synchronization priority levels, is determined based on at least a different sidelink demodulation reference signal initialization value.

* * * * *